US010951771B2

(12) United States Patent
Sterman et al.

(10) Patent No.: US 10,951,771 B2
(45) Date of Patent: *Mar. 16, 2021

(54) METHOD AND APPARATUS FOR CALL HANDLING CONTROL

(71) Applicant: VONAGE NETWORK LLC, Holmdel, NJ (US)

(72) Inventors: Baruch Sterman, Efrat (IL); Ido Mintz, Burgata (IL); Itay Bianco, Tel-Aviv (IL); Sagie Machlin, Rishon Lezion (IL)

(73) Assignee: Vonage Business Inc., Atlanta, GA (US)

( * ) Notice: Subject to any disclaimer, the term of this patent is extended or adjusted under 35 U.S.C. 154(b) by 619 days.

This patent is subject to a terminal disclaimer.

(21) Appl. No.: 13/966,846

(22) Filed: Aug. 14, 2013

(65) Prior Publication Data
US 2014/0355487 A1 Dec. 4, 2014

Related U.S. Application Data

(63) Continuation-in-part of application No. 13/907,340, filed on May 31, 2013, now abandoned.

(51) Int. Cl.
H04M 7/00 (2006.01)
H04M 11/00 (2006.01)
H04M 3/42 (2006.01)
H04M 11/06 (2006.01)
H04L 29/06 (2006.01)

(52) U.S. Cl.
CPC ...... H04M 7/0027 (2013.01); H04L 65/1096 (2013.01); H04M 3/42 (2013.01); H04M 11/007 (2013.01); H04M 11/066 (2013.01); H04M 7/006 (2013.01)

(58) Field of Classification Search
None
See application file for complete search history.

(56) References Cited

U.S. PATENT DOCUMENTS

| 5,274,700 | A | | 12/1993 | Gechter et al. |
| 5,299,260 | A | | 3/1994 | Shaio |
| 5,574,782 | A | | 11/1996 | Baird et al. |
| 5,796,424 | A | * | 8/1998 | Ely ................... H04Q 11/0478 348/14.1 |
| 7,136,475 | B1 | * | 11/2006 | Rogers et al. .......... 379/213.01 |

(Continued)

FOREIGN PATENT DOCUMENTS

| EP | 1696645 A1 | 8/2006 |
| KR | 20040071969 A | 8/2004 |
| KR | 10-1113873 B1 | 2/2012 |

OTHER PUBLICATIONS

International Search Report and Written Opinion dated Sep. 24, 2014 for Application No. PCT/US2014/039935, 12 pages.

Primary Examiner — Hong S Cho
(74) Attorney, Agent, or Firm — Moser Taboada; Joseph Pagnotta

(57) ABSTRACT

A method and apparatus for call handling control comprises receiving, from a first device, call handling information directed towards a second device, wherein a call is currently established between the first device and the second device and transmitting the call handling information to the second device, wherein the call handling information comprises feature activation instructions for the second device.

15 Claims, 6 Drawing Sheets

(56) References Cited

U.S. PATENT DOCUMENTS

| | | | |
|---|---|---|---|
| 7,248,677 B2 | 7/2007 | Randall et al. | |
| 2001/0039565 A1 | 11/2001 | Gupta | |
| 2002/0034286 A1* | 3/2002 | Crockett et al. | 379/142.02 |
| 2003/0112948 A1 | 6/2003 | Brown et al. | |
| 2005/0143103 A1 | 6/2005 | Bjorgan et al. | |
| 2007/0047523 A1 | 3/2007 | Jiang | |
| 2010/0312897 A1* | 12/2010 | Allen et al. | 709/227 |
| 2011/0281561 A1* | 11/2011 | Erb | 455/413 |
| 2012/0084361 A1* | 4/2012 | De Foy et al. | 709/204 |
| 2012/0300080 A1* | 11/2012 | Batson | 348/159 |
| 2013/0023306 A1* | 1/2013 | Somei | H04M 1/72555 455/556.1 |
| 2014/0115065 A1* | 4/2014 | Harpur et al. | 709/205 |

\* cited by examiner

METHOD AND APPARATUS FOR CALL HANDLING CONTROL

CROSS-REFERENCE TO RELATED APPLICATIONS

This application is a continuation-in-part of co-pending U.S. patent application Ser. No. 13/907,340, filed May 31, 2013, which is herein incorporated by reference.

BACKGROUND OF THE INVENTION

Field of the Invention

Embodiments of the present invention generally relate to a voice over internet protocol (VoIP) service, and more specifically, to a method and apparatus for controlling call handling.

Description of the Related Art

In the current art, a called party can dictate how to respond to a call. For example, the called party can terminate the call if it is from a particular number or if the called party is already on another call. The called party can associate media with their contacts, and have the media play on their device when a particular contact calls. In other instances, the called party can program their device to divert a call to voice mail, or to perform another action if the called party has indicated they are occupied by another task. The called party has control over how a call is handled.

However, currently the calling party has no way of controlling a call once it is placed to the called device. The calling party has no control over how a call is handled. The called party can only dial a particular telephone number, and the call is handled in accordance with the called party's direction.

Therefore, there is a need in the art for a method for enabling called party control over call handling using signaling in accordance with exemplary embodiments of the present invention.

SUMMARY OF THE INVENTION

Embodiments of the present invention relate to a method and apparatus call handling control comprising receiving, from a first device, call handling information directed towards a second device, wherein the a call is currently ongoing between the first device and the second device, coupling the call handling information from the first device to the second device, wherein the call handling information comprises feature activation for the second device.

Further embodiments of the present invention relate to a method and apparatus for call handling control comprising receiving call handling information from a first device at a second device and performing actions on the second device according to the call handling information, wherein the call handling information is received while a call is ongoing between the first device and the second device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
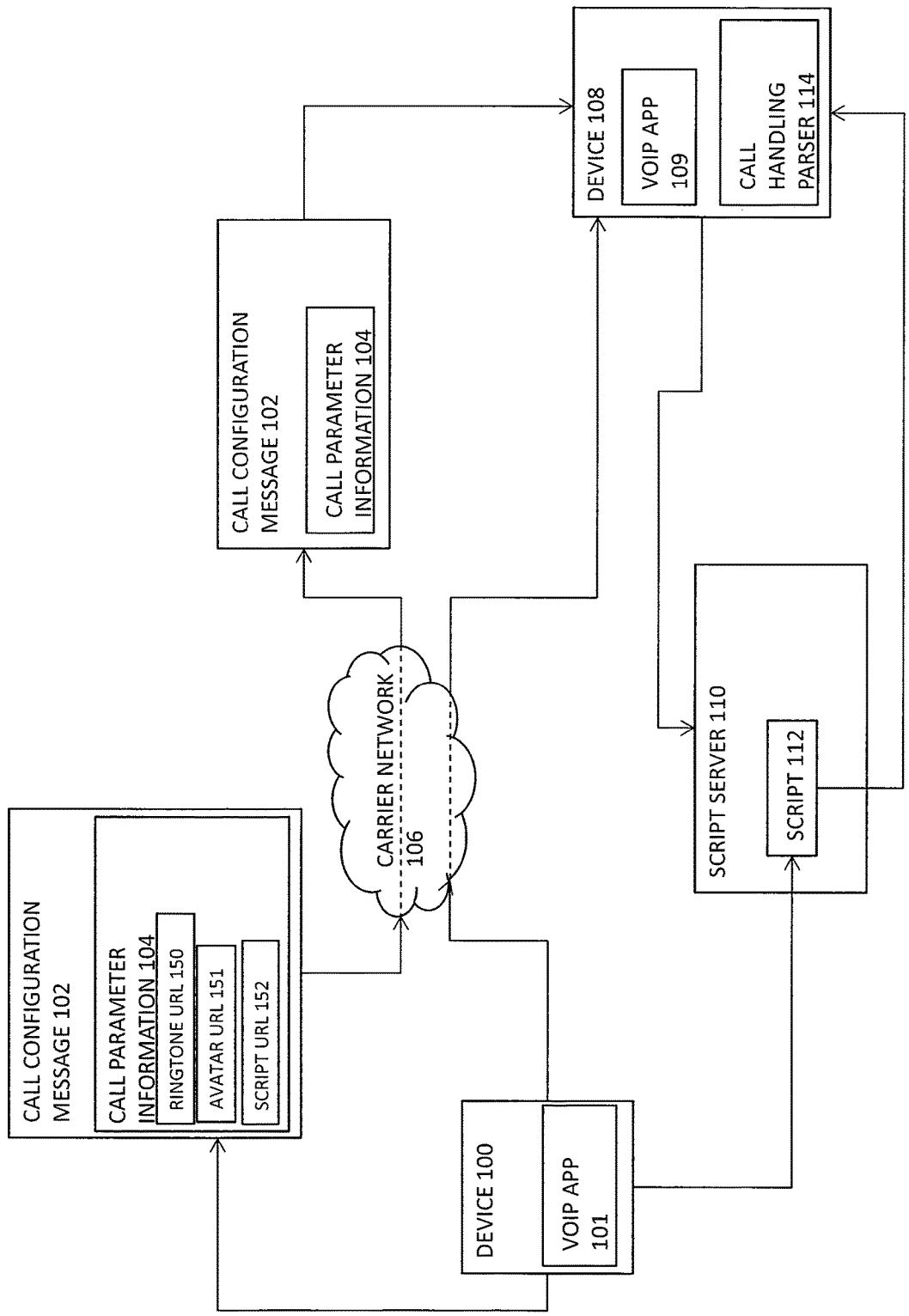
FIG. 1 is an illustration depicting interactions between a calling device and a called device in accordance with one or more embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to call handling signaling within a calling network, such as a Voice over Internet Protocol (VoIP) network. According to an exemplary embodiment, a user of a telephony device (calling device) may provide a signal indicating how their calls to any called party, or a particular called party, should be handled by the device in use by the called party. The signaling information input by the user of the calling device may further indicate a set of actions that the called device should execute upon receiving the call. In other embodiments, signaling information by a user of either device may indicate a set of actions for the other device to execute during an ongoing call.

FIG. 1 is an illustration depicting interactions between a calling device 100 and a called device 108 in accordance with one or more embodiments of the present invention. The device 100 and the device 108 are hosted on the carrier network 106, though according to other embodiments, the two devices may be hosted by two different carrier networks. The device 100 and device 108 may optionally have respective VoIP application (VoIP APP) 101 and VoIP application 109 stored thereon. The VoIP applications 101 and 109 are managed by the same service provider. Subscribers, i.e., users of device 100 and 108, are able to communicate with other devices via the carrier network 106 by using the VoIP application 101 and the VoIP application 109.

In order to initiate a call between devices, a call configuration message is generally sent to the carrier network 106. According to an exemplary embodiment, the carrier network 106 is a VoIP network. In other embodiments, however, the carrier network 106 may be a non-VoIP network such as a circuit switched network or the like. Those of ordinary skill in the art would recognize that the present invention may be embodied on devices utilizing any type of network. In a VoIP network, this message oftentimes takes the form of a Session Initiation Protocol (SIP) INVITE message. The details and functionality of SIP can be found in the Internet Engineering Task Force (IETF) Request for Comments (RFC) Paper No. 3261 entitled, "SIP: Session Initiation Protocol" herein incorporated in its entirety by reference. In other types of networks, other call configuration messages are submitted to the network such as H.323 (a protocol for providing audio visual communication sessions over packet networks), JINGLE (a protocol for peer to peer session control for multimedia interactions such as VoIP) messages, or the like.

A user interacts with the device 100 and indicates to the VOIP APP 101 that a call placed from device 100 should be handled in a particular way. That handling information is stored in a call configuration message 102 as call parameter information 104. According to other embodiments, SIP messages, or other messages, may be exchanged between devices during an ongoing call, and not just at the call configuration stage, to dynamically alter the ongoing call. In some embodiments, the call parameter information 104 may comprise, for example, at least one of ringtone URL 150, avatar URL 151 and script URL 152. The call configuration message 102 is delivered to the carrier network 106, which then forwards the message 102 to the device 108.

According to this embodiment of the invention, carrier network 106 is unaware of the additional information stored in the call configuration message 102, and the carrier network 106 processes the call configuration message 102 to perform any configuration prior to establishing the call between device 100 and device 108. The device 108 receives the call configuration message 102 comprised of, among other information, call parameter information 104. The device 108 then handles the call according to the call parameter information 104. According to another embodiment, the carrier network 106 can parse the call parameter information 104 from the call configuration message 102 and prompt the device 108 to perform particular functions as indicated by the call parameter information 104. In some instances, the call parameter information 104 may contain redirect instructions, where the carrier network 106 redirects a call to another device.

According to some embodiments, the call parameter information 104 may contain call handling instructions indicating how the device 108 should handle the call. The call handling instructions may indicate that the device 108 should go to voicemail if the user of device 108 is already engaged in a call, or send a text message to the device 100 that the user of device 108 is engaged in a call. The call parameter information may also contain an embedded caller ID, name of the caller, content from a social media account, instructions to enable device functionality such as a camera phone, enable remote monitoring or disabling a called device remotely using embedded call instructions, application flags, and other simple data.

Those of ordinary skill in the art will appreciate that any instructions related to call handling for the device 108 to execute can be inserted into the call parameter information 104. If the device 108 is capable of executing the particular instructions, then the device 108 will execute the instructions according to the call parameter information 104. In some instances, if the device 108 is not capable of executing call handling instructions, the carrier network 106 may return a system message to the device 100 indicating the status of device 108. In yet another embodiment, the call parameter information 104 may contain direct links to one or more media items, and the device 108 automatically parses those links and plays or displays media from those links upon receiving a call from device 108.

According to other embodiments, the call handling instructions may initiate a "call-hunt", i.e., dialing up to a threshold number of telephone numbers if an initial number does not respond. The call configuration message 102 may be a session initiation protocol (SIP) INFO, UPDATE, NOTIFY or INVITE message, or could be embedded in other types of signaling such as H.323, JINGLE, or the like. Those of ordinary skill in the art would recognize that the call configuration message 102 may take the form of any configuration message passed through a carrier network, and the call parameter information 104 may be embedded in any data/voice packets travelling across the carrier network 106. In the SIP protocol, messages contain a content header, for example, "Content-Type: application/sdp", however content is not limited to session description protocol (SDP) content alone and may be any form of content. According to some embodiments of the present invention, the call parameter information 104 may provide a link to a script containing call handling instructions. The user of device 100 may compose, or use another application to compose, a script 112, which comprises a set of instructions for call handling on a called device. The script 112 may, according to an exemplary embodiment, be stored on script server 110. In another embodiment, the script 112 may be accessed from storage within the carrier network 106. According to yet another embodiment, the script 112 may be embedded into the call parameter information 104 directly based on the size of the script 112. In some instances, the call parameter information 104 may be directly embedded in the SDP content of a SIP message instead of linking to an external URL.

The script 112 comprises a set of instructions to be executed by the device 108. According to an exemplary embodiment, the device 108 further comprises a call handling parser 114, which can interpret the script 112 and execute the script 112. The script 112 may contain call handling information indicating that if the device 108 is already on a call, the call from the device 100 should be directed to voicemail. The script 112 may contain call handling information indicating that if the device 108 is already on a call, the user of device 100 can have his call transcribed and texted to the device 108. According to other embodiments, the script 112 may comprise instructions to play one or more media items, such as ringtones, video clips, displaying pictures, or the like. In exemplary embodiments, the script may be composed of JavaScript, or any other well known and suitable scripting language.

According to another embodiment, the call parameter information 104 may provide a link to a web page containing a user interface. The called party is provided an interactive interface for enabling advanced call termination based on responses from the calling party. In this embodiment, user interface design tools may be provided to the calling party to customize user interfaces for their called parties. In other embodiments, the device 108 may be configured to display a user interface through means other than a web page, such as on a VOIP APP. For example, the VOIP APP may be configured to parse and execute script 112 by displaying an appropriate user interface.

In some instances, the interfaces may be customized for particular parties, or based on the status or type of the called device. For example if the called device is a mobile phone, a user interface compatible with a mobile device resolution is provided in the call parameter information 104, and if the called device is a tablet, a more robust and complete interface is provided. The calling party may also provide customizable contact buttons such as email buttons, or the like, as a part of the user interface, enabling the called party to communicate with the calling party at their convenience. In some instances, the called party may determine what times they are available to receive a call and program the called device to send a message back to the calling party automatically indicating future call back times According to other embodiments, the call parameter information 104 may be a vehicle for delivering advertisements to the called party or called device. In one instance, the advertising information is provided directly in the call parameter information 104. In other instances, the call parameter information 104 contains a link to a web site containing the advertising, a link to audio/video advertisements, or the like. According to some embodiments, the calling party may embed advertisements into their scripts, i.e., provide callback handling as well as advertisements. The advertisements may also be used in the logic contained in the script 112, for example, displaying the advertisement if the user is unavailable. In some instances, the called party may determine what times they are available to receive a call and program the called device to send a message back to the calling party automatically indicating future call back times.

Figure 2:
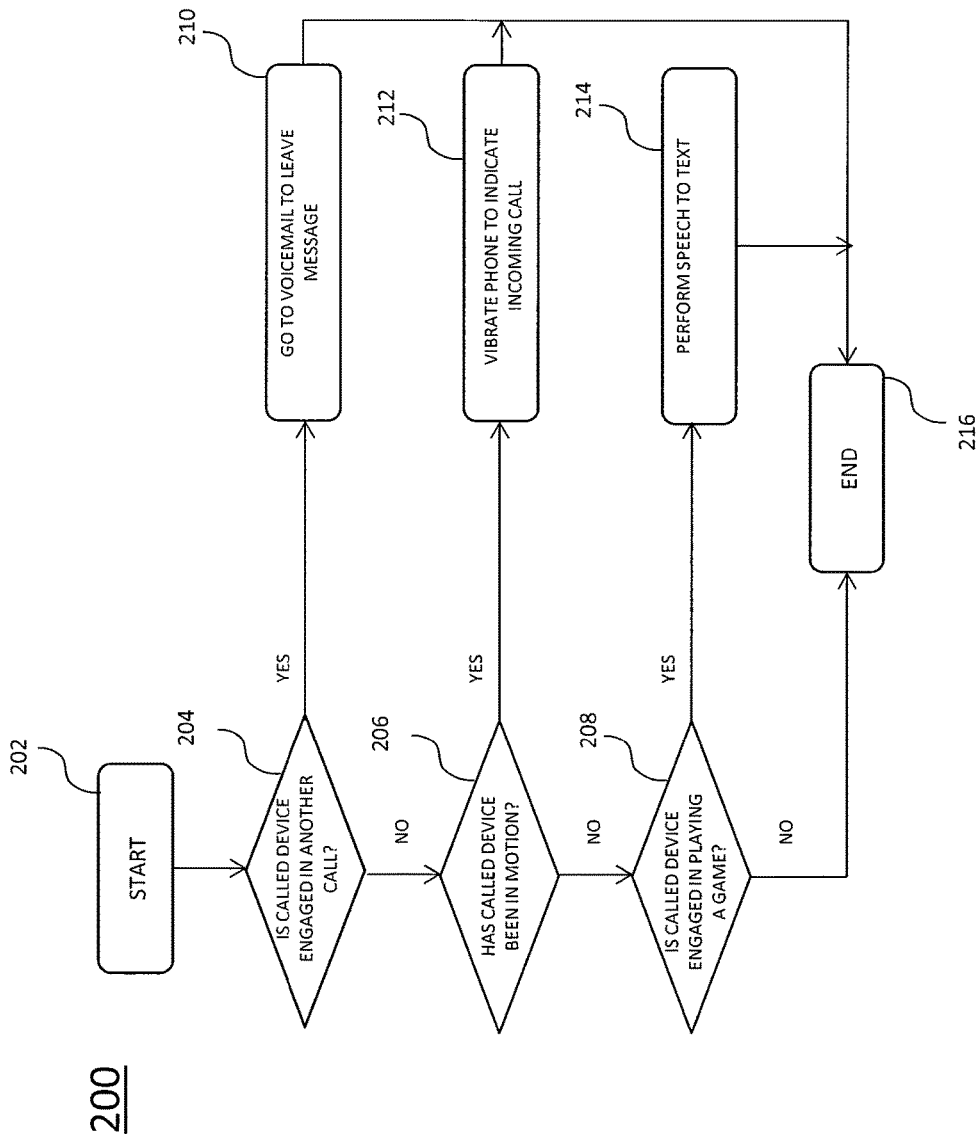
FIG. 2 is a depiction of a flow diagram of an instruction set for an exemplary script as described above in accordance with embodiments of the present invention.

FIG. 2 is a depiction of a flow diagram of an instruction set 200 for an exemplary script as described above in accordance with embodiments of the present invention. FIG. 2 illustrates user programmed logic embedded either into the call parameter information 104, or stored in a script located on a server. A URL linking to the script is stored in the call parameter information 104.

The instruction set 200 begins at step 202 and proceeds to step 204. At step 204, the instruction set 200 determines whether a called device is engaged in another call. If the called device is engaged in another call, the instruction set requests that the called device forward the calling party to voicemail allowing the calling party to leave a message at step 210.

If the instruction set 200 determines that the called device is not engaged in another call, the instruction set 200 proceeds to step 206, where it is determined whether the called device has been in motion. If it is determined the called device has been in motion or is in motion, the method proceeds to step 212, where the called device is vibrated, for example, to indicate that a call is incoming. In other instances, any alert or notification can be presented to the user in order to notify the user of an incoming call.

If the instruction set 200 determines that the called device is not in motion, the instruction set 200 proceeds to step 208. At step 208, the instruction set determines whether the user of the device is playing a game on the device, and if so, performs speech to text on the calling party's message at step 214, and messages the called device. At step 216, the instruction set 200 terminates the call.

According to alternate embodiments, if the first device and the second device are already engaged in a call together and the first or second device receives another call, the instruction set may be programmed to automatically reject the incoming call.

Figure 3:
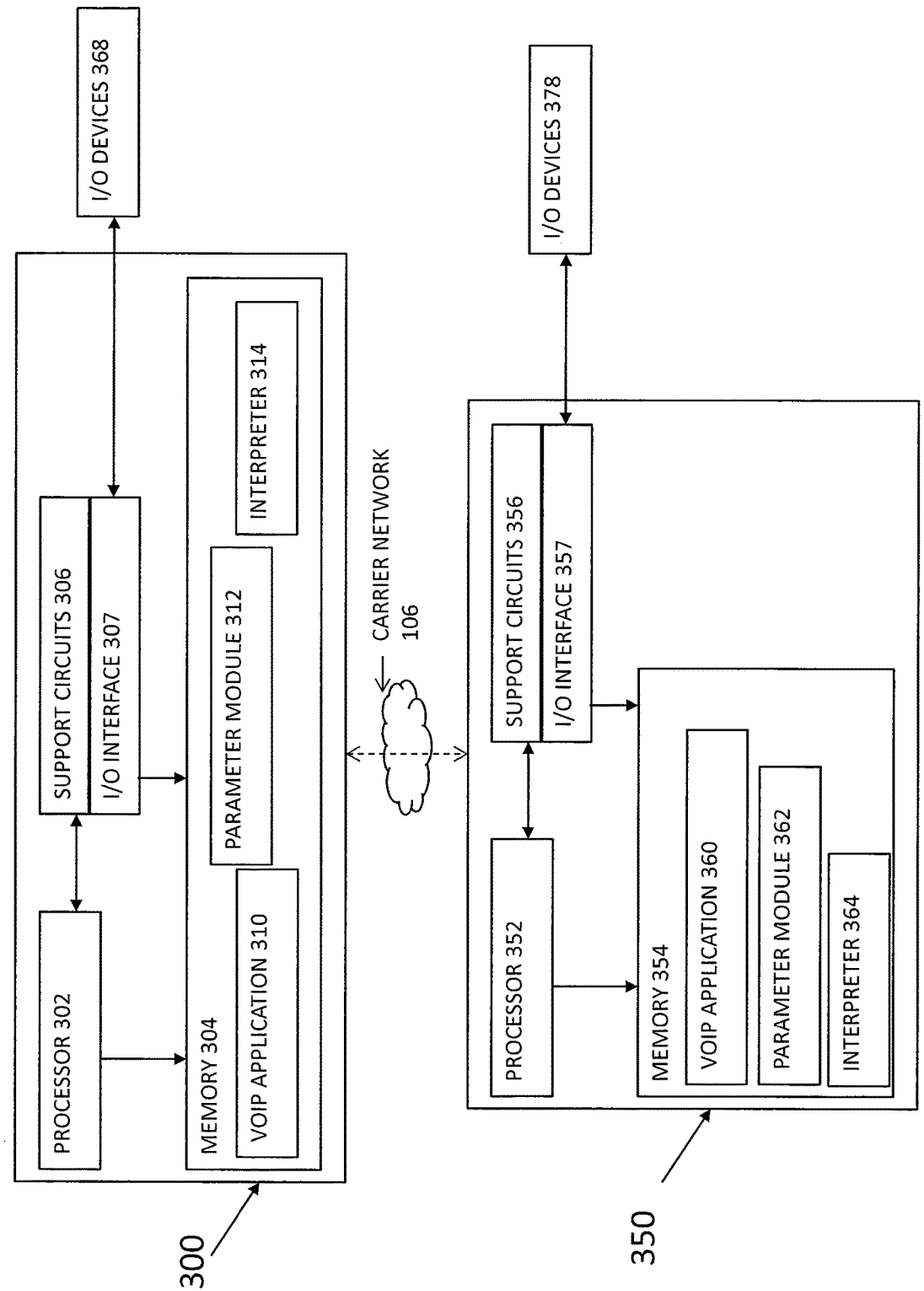
FIG. 3 is a detailed depiction of a first and second computer system in accordance with at least one embodiment of the present invention.

FIG. 3 is a more detailed depiction of the device 100 as a computer system 300 and the device 108 as a computer system 350 in accordance with at least one embodiment of the present invention. The computer system 300 includes a processor 302, various support circuits 306, and memory 304. The processor 302 may include one or more microprocessors known in the art. The support circuits 306 for the processor 302 include conventional cache, power supplies, clock circuits, data registers, I/O interface 307, and the like. The I/O interface 307 may be directly coupled to the memory 304 or coupled through the support circuits 306. The I/O interface 307 may also be configured for communication with input devices and/or output devices 368 such as network devices, various storage devices, mouse, keyboard, display, video and audio sensors, IMU and the like.

The memory 304, or computer readable medium, stores non-transient processor-executable instructions and/or data that may be executed by and/or used by the processor 302. These processor-executable instructions may comprise firmware, software, and the like, or some combination thereof. Modules having processor-executable instructions that are stored in the memory 304 comprise a VoIP application 310, a parameter module 312, and an interpreter 314. The computer 300 may be programmed with one or more operating systems, which may include OS/2, Java Virtual Machine, Linux, SOLARIS, UNIX, HPUX, AIX, WINDOWS, IOS, and ANDROID among other known platforms.

The computer 350 includes a processor 352, various support circuits 356, and memory 354. The processor 352 may include one or more microprocessors known in the art. The support circuits 356 for the processor 352 include conventional cache, power supplies, clock circuits, data registers, I/O interface 357, and the like. The I/O interface 357 may be directly coupled to the memory 354 or coupled through the support circuits 356. The I/O interface 357 may also be configured for communication with input devices and/or output devices 378 such as network devices, various storage devices, mouse, keyboard, display, video and audio sensors, IMU and the like.

The memory 354, or computer readable medium, stores non-transient processor-executable instructions and/or data that may be executed by and/or used by the processor 352. These processor-executable instructions may comprise firmware, software, and the like, or some combination thereof. Modules having processor-executable instructions that are stored in the memory 354 comprise a VoIP application 360, a parameter module 362 and an interpreter 364. The computer 350 may be programmed with one or more operating systems, which may include OS/2, Java Virtual Machine, Linux, SOLARIS, UNIX, HPUX, AIX, WINDOWS, IOS, and ANDROID among other known platforms.

The memory 304 and the memory 354 may include one or more of the following random access memory, read only memory, magneto-resistive read/write memory, optical read/write memory, cache memory, magnetic read/write memory, and the like, as well as signal-bearing media as described below.

Both computer systems 300 and 350 (i.e., devices 100 and 108, respectively) contain a parameter module and an interpreter. The parameter module 312, for example, allows a user of the system 300 to program call back handling information and enter call back parameters, such as ringtone URL, script URL, avatar URL. Subsequently, when the user of computer system 300 uses the VoIP application 310 to place a call to the VoIP application 360, the parameter module 312 couples with the VoIP application 310 to modify an outgoing call configuration message, i.e., call configuration message 102 of FIG. 1. The call configuration message will be submitted to the network 106 before placing the call between VoIP application 310 and VoIP application 360.

The carrier network 106 receives the call configuration message from the VoIP application 310, and, according to one embodiment, forwards the message to the VoIP application 360. The computer system 350 then invokes the interpreter 364 to parse the call configuration message to determine whether any parameters for call handling have been added. If the computer system 350 did not have the interpreter 364 installed in memory 354, the VoIP application 360 would ignore the information embedded by the parameter module 312. The interpreter 364 is also capable of fetching scripts, audio, video, images and the like from a URL hosted on a script server, such as script server 110 shown in FIG. 1, embedded in the call configuration message. The interpreter 364 parses a script from the embedded URL, such as the instruction set 200 shown in FIG. 2. If the computer system 350 is unable to perform some of the instructions in instruction set 200, for example, modifying the vibration pattern of the system 350, the interpreter 364 ignores those instructions.

Once the computer system 350 accepts a call from computer system 300, the interpreter 364 interprets the call parameter information and directs the VoIP application 101 to perform the behavioral functionality contained in the call parameter information, for example, call parameter information 104 shown in FIG. 1, given by the user of computer system 300. According to some embodiments, the user of computer system 350 opts to enable call handling from a calling party, and may opt out of call handling altogether. In some instances, the called computer system 350 may specify that the call handling instructions can be executed if a special code is embedded in the instructions, or in the call parameter information, indicating that a trusted party is attempting to perform call handling. Further, the code may be an encrypted key generated according to algorithms well known in the art.

Those of ordinary skill will recognize that call handling information can also be sent to landlines, where the calling party and the called party have specially provisioned hardware, such as computer systems 300 and 350, coupled to their landline device, to enable call handling from a called party.

Figure 4:
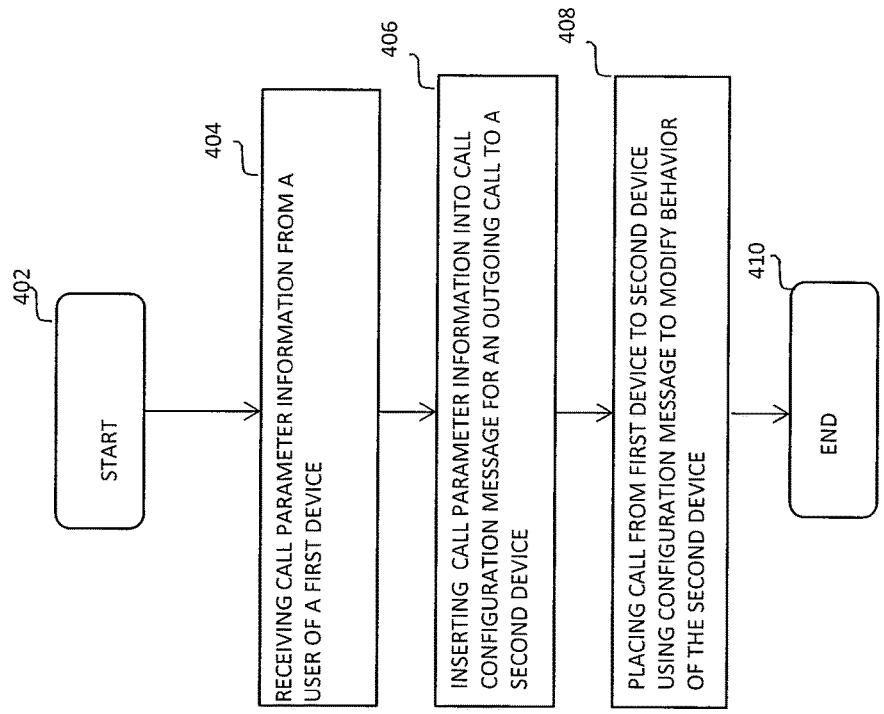
FIG. 4 depicts a flow diagram for a method for call handling in accordance with previous embodiment of the present invention as depicted in FIGS. 1-3.

FIG. 4 depicts a flow diagram for a method 400 for call handling in accordance with the embodiment of the present invention as depicted in FIGS. 1-3. The method 400 is an exemplary implementation of the VoIP application 310 and the parameter module 312 as executed on the computer system 300 shown in FIG. 3.

The method 400 begins at step 402 and proceeds to step 404. At step 404, the parameter module 312 receives a call request for a call from a first device to a second device. The call request may comprise call handling information, comprising call parameter information from a user of a first device, i.e., computer system 300. The device may be computer software, a mobile device, a VoIP device or the like.

Once the call parameter information has been received, the parameter module 312 formats the call parameter information. For example, the parameter module 312 formats the parameter information using extensible markup language (XML), though those of ordinary skill in the art would recognize that this format is presented as merely an example, and is not limiting. Additionally, if the call parameter information includes audio or visual data, the call parameter module 312 may upload the data to a server, and allow the data to be accessed via a URL, which is embedded into the call parameter information. According to some embodiments, the call parameter information may comprise call information such as call urgency. For example, if a user has silenced their device, incoming call parameter information may indicate the incoming call is of high urgency. If the user of the silenced device has permitted the caller, the called device will disable silenced mode and allow the user to hear the ringtone of the device.

At step 406, the call parameter module 312 inserts the formatted call parameter information into a call configuration message for an outgoing call to a second device, for example computer system 350 executing VoIP application 360.

At step 408, the VoIP application 310 transmits an outgoing call request to the second device, i.e., places a call from the computer system 300 to the computer system 350 using the configuration message, in order to control call handling of the second computer system 350 according to the call parameter information. The outgoing call request is based at least in part upon the call handling information. The method terminates at step 410.

Figure 5:
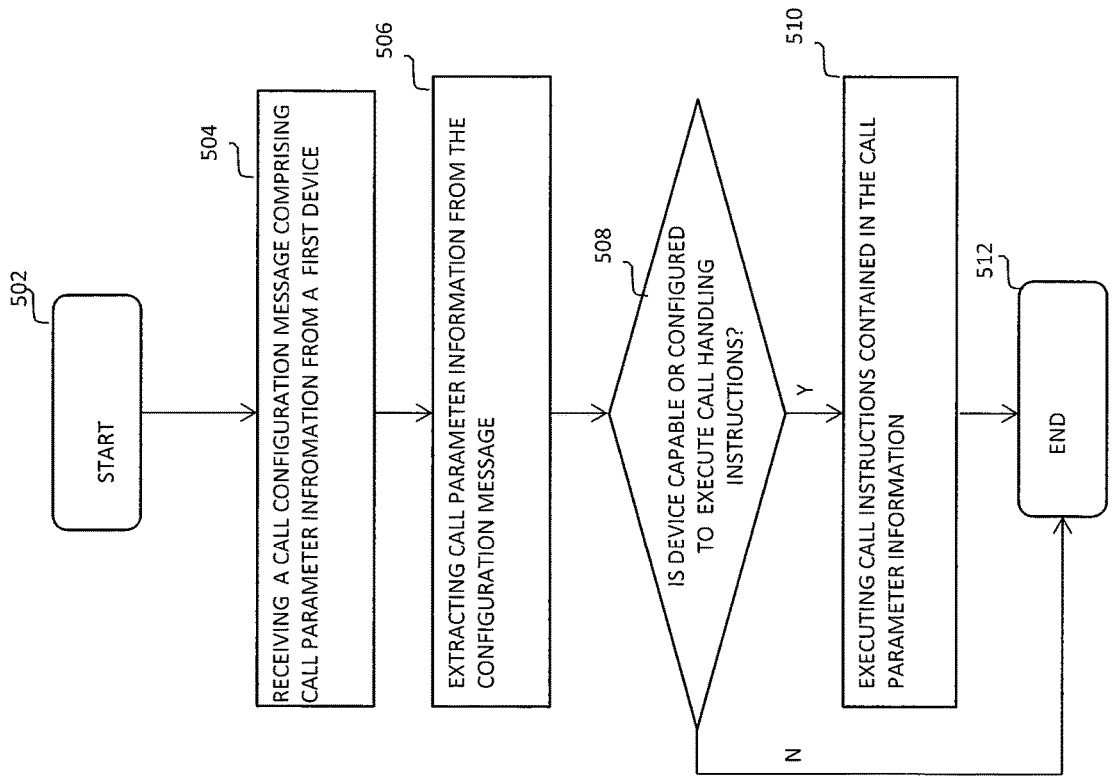
FIG. 5 depicts a flow diagram for a method for incoming call handling in accordance with previous embodiment of the present invention as depicted in FIGS. 1-3.

FIG. 5 depicts a flow diagram for a method 500 for call handling in accordance with the embodiment of the present invention as depicted in FIGS. 1-3. The method 500 is an exemplary implementation of the VoIP application 360 and the interpreter 364 as executed on the computer system 350 shown in FIG. 3.

The method 500 begins at step 502 and proceeds to step 504. At step 504, the VoIP application 360 receives a call configuration message comprising call parameter information from a user of a first device, i.e., computer system 300. The device may be computer software, a mobile device, a VoIP device or the like.

Once the call configuration message is received, call parameter information is extracted from the call configuration message by the VoIP application 360 at step 506. If, at step 508, the VoIP application 360 determines that the computer system/device 350 is not capable of, or has not enabled, call handling instructions from a called party, the method terminates at step 512.

If the computer system 350 is capable of receiving and executing the call instructions in the call parameter information, the method proceeds to step 510. At step 510, the VoIP application 360 forwards the call parameter information to the interpreter 364.

The interpreter 364 parses the call parameter information, and retrieves scripts and media located by URLS embedded in the call parameter information. At step 510, the interpreter 364 then parses and executes the call handling instructions contained in the scripts when a call is received from computer system 300. The method terminates at step 512.

Figure 6:
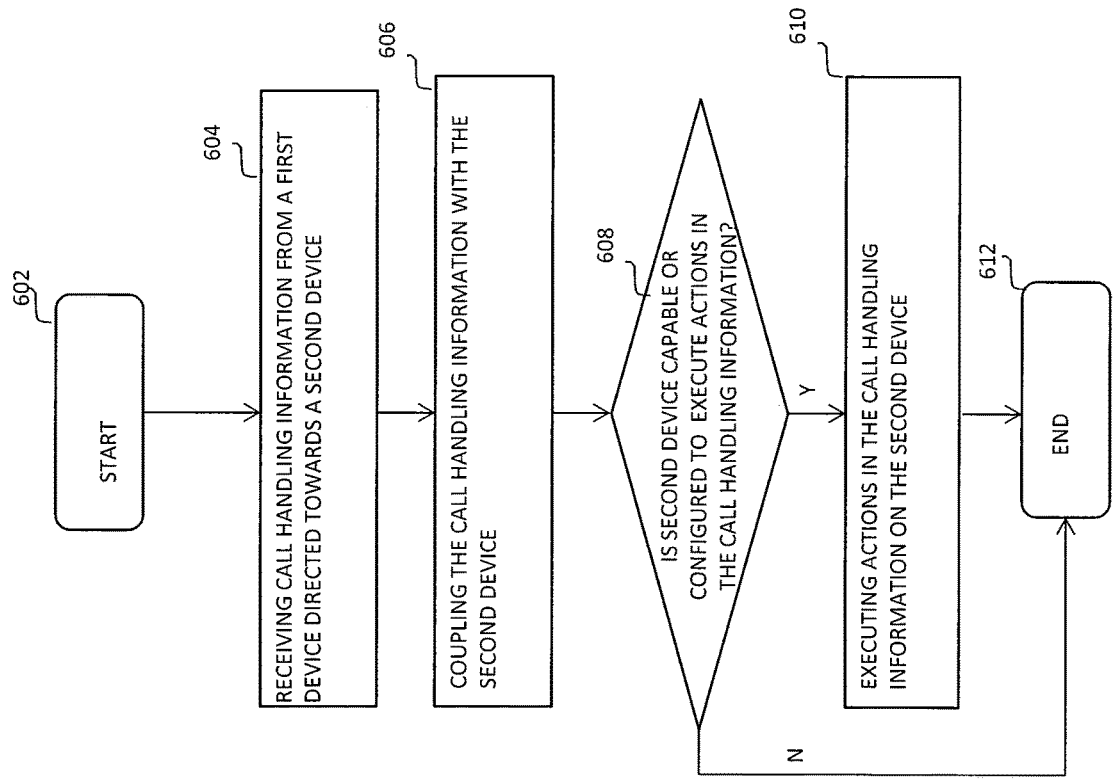
FIG. 6 depicts a flow diagram for a method for call handling in accordance with further embodiment of the present invention as depicted in FIGS. 1-3.

FIG. 6 depicts a flow diagram for a method 600 for call handling in accordance with further embodiment of the present invention as depicted in FIGS. 1-3. The method 600 is an exemplary implementation of the VoIP application 360 and the interpreter 364 as executed on the computer system 350 shown in FIG. 3.

The method 600 begins at step 602 and proceeds to step 604. At step 604, the VoIP application 360 receives call handling information from a user of a first device, i.e., computer system 300. The device may be computer software, a mobile device, a VoIP device or the like. According to this embodiment, the first device and second device are engaged in an ongoing call when the call handling information is composed. In other embodiments, the call handling information is composed before the call is initiated. The call handling information may be composed by the user of the first device based on input submitted to a user interface by the user.

According to one embodiment, the call handling information may contain programmatic statements such as those shown in FIG. 2, containing scripting logic.

According to one embodiment, the user interface may be based on features available on the second device, and on the type of the second device. For example, if the second device contains multiple cameras, the user interface allows the user to select which camera will be enabled or disabled. If the second device contains a speaker, or speakerphone functionality, the user interface may allow the user to modify the volume, or enable/disable the speakerphone. Additionally, if the second device is capable of audio or video playback, can display particular types of files, or execute particular applications, the user interface may allow for selection of media files to play, applications to execute, or files to display accordingly.

Once the call handling information is received, the call handling information is coupled with the second device by the VoIP application 360 at step 606. According to exemplary embodiments, the coupling of the handling information occurs while the first device and the second device are engaged in an ongoing communication such as a voice or video call. Accordingly, the user of the first device dynamically scripts how he or she would like the second device to behave, subject to permissions preset by a user of the second device. Alternatively, as the second device receives the call handling information, the user of the second device may be prompted to allow a particular action contained in the call handling information, or to allow the call handling information as a whole to control his or her device.

The user of the second device may enable or disable permissions on the second device. The permissions indicate a correspondence between callers and permitted actions on the second device. The user may selectively permit one user to send call parameter information for executing scripts on the second device, whereas another user may not be permitted to enable any call handling on the second device. Various combinations of permissions are possible allowing a user to customize who and how the second device is configured for call handling.

According to an exemplary embodiment, the call handling information is coupled to the second device via a message. For example, the call handling information may be embedded in a SIP NOTIFY message. In other instances, the underlying messaging structure employs the Extensible Messaging and Presence Protocol (XMPP). In this embodiment, the call handling information may be embedded in an XMPP message. Other messaging systems that may be used include WebRTC, HTTP, or the like. According to these embodiments, the call handling information may be comprised of XML, Session Description Protocol (SDP), JSON or simple text. According to yet another embodiment, the call handling information may be embedded in short message service (SMS) messages.

If, at step 608, the VoIP application 360 determines that the computer system/device 350 is not capable of, or has not enabled, call handling information from a called party, the method terminates at step 612.

If the computer system 350 is capable of receiving and executing the actions described in the call handling information in the call parameter information, the method proceeds to step 610, where the computer system 350 executes the actions.

While the foregoing is directed to embodiments of the present invention, other and further embodiments of the invention may be devised without departing from the basic scope thereof, and the scope thereof is determined by the claims that follow.

The invention claimed is:

1. A method for call handling control comprising:
   receiving, from a first device, a call request including call handling information directed towards a second device; and
   transmitting the call request and the call handling information to the second device, wherein the call handling information comprises instructions to be executed by the second device for controlling what features are activated on the second device during the call, wherein the call handling information activates features on the second device comprising at least one of enabling one or more cameras on the second device, toggling a primary camera from the one or more cameras on the second device, or adjusting a volume of the second device.

2. The method of claim 1 further comprising:
   embedding a user specified uniform resource locator (URL) into the call handling information.

3. The method of claim 2 wherein the URL links to a script comprising a set of programmatic statements for execution on the second device.

4. The method of claim 3, further comprising:
   embedding a media URL into the script for playing on the second device.

5. The method of claim 4, wherein the media comprises at least one of a text file, an audio file, a video file, or an image.

6. The method of claim 1 wherein the call handling information comprises conditional logic, the conditional logic comprising at least:
   determining whether the second device is in a particular state, and if the second device is in the particular state, performing an action according to a script.

7. The method of claim 1 wherein the call handling information is embedded into a content portion of a signaling protocol message.

8. The method of claim 7, wherein the call handling information comprises a uniform resource locator to media content, the media content comprising at least one of a text file, an audio file, a video file, or an image.

9. The method of claim 1 further comprising:
   composing actions contained in the call handling information based on input received by a user of the first device through a user interface displayed on the first device.

10. The method of claim 9 further comprising:
    receiving, from the second device, a message indicating available functionality and device type of the second device; and
    generating the user interface based on the available functionality and the device type of the second device.

11. A method for call handling control comprising:
    receiving call handling information from a first device at a second device, wherein the call handling information comprises instructions to be executed by the second device for controlling what features are activated on the second device during the call; and
    controlling the second device according to the call handling information, wherein controlling the second device comprises at least one of enabling one or more cameras on the second device, toggling a primary camera from the one or more cameras on the second device, or adjusting a volume of the second device.

12. The method of claim 11, wherein controlling the second device comprises executing an application.

13. The method of claim 11 further comprising:
receiving the call handling information via a session initiation protocol (SIP) message.

14. The method of claim 13 wherein the SIP message is a SIP NOTIFY message.

15. An apparatus for outgoing call handling control comprising:
a processor; and
a memory coupled to the processor, the memory having stored therein a parameter module and a voice over internet protocol (VoIP) application comprising instructions executable by the processor to configure the apparatus to:
receive a call request including call handling information directed towards a second device; and
transmit the call request and the call handling information to the second device, wherein the call handling information comprises instructions to be executed by the second device for controlling what features are activated on the second device during the call wherein the call handling information activates features on the second device comprising at least one of enabling one or more cameras on the second device, toggling a primary camera from the one or more cameras on the second device, or adjusting a volume of the second device.

* * * * *